United States Patent
Christensen et al.

(10) Patent No.: US 11,926,370 B2
(45) Date of Patent: Mar. 12, 2024

(54) PICKUP TRUCK CARGO BED EXTENSION SYSTEMS

(71) Applicant: GM GLOBAL TECHNOLOGY OPERATIONS LLC, Detroit, MI (US)

(72) Inventors: Blaine D. Christensen, Sterling Heights, MI (US); William A. McDonald, Waterford, MI (US); Carl J. Zipfel, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 181 days.

(21) Appl. No.: 17/344,438

(22) Filed: Jun. 10, 2021

(65) Prior Publication Data
US 2022/0396319 A1    Dec. 15, 2022

(51) Int. Cl.
B62D 33/03      (2006.01)
B60P 3/40       (2006.01)
B60R 9/06       (2006.01)
B62D 33/027     (2006.01)
B62D 33/037     (2006.01)
B62D 33/08      (2006.01)

(52) U.S. Cl.
CPC .............. B62D 33/08 (2013.01); B60P 3/40 (2013.01); B60R 9/06 (2013.01); B62D 33/0273 (2013.01); B62D 33/03 (2013.01); B62D 33/037 (2013.01)

(58) Field of Classification Search
CPC .............. B62D 33/0273; B62D 33/03; B62D 33/037; B62D 33/08; B60P 3/40; B60R 9/06
See application file for complete search history.

(56) References Cited

U.S. PATENT DOCUMENTS

| | | | | |
|---|---|---|---|---|
| 4,531,773 A | * | 7/1985 | Smith | B62D 33/0273 224/403 |
| 5,478,130 A | * | 12/1995 | Matulin | B62D 33/0273 296/57.1 |
| 5,669,654 A | * | 9/1997 | Eilers | B60P 1/003 296/26.11 |
| 5,918,925 A | * | 7/1999 | Perrin | B62D 33/0273 296/26.11 |
| 5,924,753 A | * | 7/1999 | DiBassie | B62D 33/0273 296/26.1 |

(Continued)

OTHER PUBLICATIONS

2019 Chevy Silverado (Year: 2018).*

(Continued)

*Primary Examiner* — Gregory A Blankenship (57) ABSTRACT

A cargo bed extension system includes: a cargo bed; a tailgate configured to pivot to a down position via one or more first hinges, where the tailgate includes: an outer portion having first lateral sides and one or more second hinges; an inner portion having second lateral sides that are disposed adjacent to the first lateral sides when the tailgate is in the down position, where the inner portion is configured to rotate to a vertical position via the one or more second hinges, where the vertical position is approximately perpendicular to the down position; at least one first extension panel configured to move rearwardly and directly contact the inner portion when the inner portion is in the vertical position; and at least one second extension panel configured to move rearwardly and to directly contact the inner portion when the inner portion is in the vertical position.

20 Claims, 7 Drawing Sheets

(56) References Cited

U.S. PATENT DOCUMENTS

| | | | | |
|---|---|---|---|---|
| 6,019,410 | A * | 2/2000 | Trostle | B60P 3/40 296/26.11 |
| 6,179,360 | B1 * | 1/2001 | Davian | B62D 33/033 296/26.11 |
| 6,367,858 | B1 * | 4/2002 | Bradford | B60P 3/40 296/26.11 |
| 6,378,926 | B1 * | 4/2002 | Renze | B60P 3/40 296/183.1 |
| 8,109,552 | B2 * | 2/2012 | Nelson | B62D 33/0273 224/403 |
| 8,182,012 | B1 * | 5/2012 | Brister | B60P 3/40 296/26.11 |
| 9,156,507 | B1 * | 10/2015 | Reed | B60R 5/041 |
| 9,365,247 | B1 * | 6/2016 | Thompson | B60P 3/40 |
| 9,809,142 | B1 * | 11/2017 | White | B62D 33/0273 |
| 11,059,423 | B1 * | 7/2021 | Weaver | B62D 33/027 |
| 2010/0026027 | A1 * | 2/2010 | Gao | B62D 33/0273 296/26.11 |
| 2015/0102624 | A1 * | 4/2015 | Kmita | B60R 11/06 296/37.6 |
| 2017/0158254 | A1 * | 6/2017 | Singer | B62D 21/14 |
| 2017/0282979 | A1 * | 10/2017 | Singer | B62D 21/14 |
| 2017/0361757 | A1 * | 12/2017 | Higgins | B62D 33/0273 |
| 2018/0134205 | A1 * | 5/2018 | Karumuri | B62D 33/03 |
| 2018/0257537 | A1 * | 9/2018 | DeSimone | B62D 33/0273 |
| 2020/0198545 | A1 * | 6/2020 | Townson | B60R 7/02 |
| 2021/0039722 | A1 * | 2/2021 | Williamson | B62D 33/03 |
| 2021/0188368 | A1 * | 6/2021 | Williams | B60P 3/40 |
| 2022/0032854 | A1 * | 2/2022 | Burke | B60R 9/10 |
| 2022/0136297 | A1 * | 5/2022 | Roberson | E05D 15/26 49/37 |
| 2022/0396319 | A1 * | 12/2022 | Christensen | B62D 33/037 |
| 2023/0256891 | A1 * | 8/2023 | Harmon | B62D 33/027 296/26.08 |
| 2023/0257031 | A1 * | 8/2023 | Harmon | B62D 33/08 296/26.08 |

OTHER PUBLICATIONS

GMC Terradyne Concept: Autopedia, Fandom, accessed Apr. 20, 2021. <https://automobile.fandom.com/wiki/GMC_Terradyne_Concept>.

Elongator Tailgates—The "Swiss Army Knife" of Tailgaes—Multifunction Tailgates by Elongator. Accessed Apr. 20, 2021. <https://elongator.com/>.

Larry Quick, Anaheim: "Truck Bed Extension" Anaheim, Published Aug. 3, 2018. <https://www.youtube.com/watch?v=AAYek6oBSP0>.

* cited by examiner

PICKUP TRUCK CARGO BED EXTENSION SYSTEMS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to pickup trucks and more particularly to pickup truck bed extension systems.

Various different types of vehicles are sold throughout the world. Examples of vehicles include coupes, sedans, utility vehicles, pickup trucks, and other types of vehicles.

Pickup trucks come in various different sizes. For example, pickup trucks are available in both two and four door varieties. Multiple different sizes of passenger cabins are also available in pickup trucks.

Pickup trucks all have a cargo bed. Different sizes of cargo beds are available, such as 60" long to 100" long and various sizes between 60" and 100". Items can be placed within a cargo bed of a pickup truck and moved from place to place.

SUMMARY

In a feature, a cargo bed extension system of a pickup truck includes: a cargo bed; and a tailgate that defines a rearward most point of the cargo bed, the tailgate defining a portion of a top most edge of the cargo bed when the tailgate is in a closed position and configured to pivot to a down position via one or more first hinges, where the down position is approximately perpendicular to the closed position, where a first distance between a forward most point of the cargo bed and the tailgate when the tailgate is in the closed position is less than or equal to 6 feet. The tailgate includes: an outer portion having first lateral sides and one or more second hinges; and an inner portion having second lateral sides that are disposed adjacent to the first lateral sides when the tailgate is in the down position, where the inner portion is configured to rotate to a vertical position via the one or more second hinges, where the vertical position is approximately parallel to the closed position and approximately perpendicular to the down position, and where a second distance between the forward most point of the cargo bed and the inner portion when the inner portion is in the vertical position is at least 8 feet.

In further features, the first distance is 5 feet 10 inches.

In further features, a height of the outer portion is at least 20 inches.

In further features, at least one spring pin is configured to maintain the inner portion in the vertical position.

In further features, the inner portion is further configured to rotate to a second vertical position via the one or more second hinges, where the second vertical position is approximately parallel to the closed position, approximately perpendicular to the down position, and approximately 180 degrees from the vertical position.

In further features, the inner portion includes one or more handles formed in an edge of the inner portion disposed closest to the one or more first hinges when the tailgate is in the closed position.

In further features: the inner portion includes a first inner surface and a first outer surface; the outer portion includes a second inner surface and a second outer surface; the first inner surface faces the second inner surface when the tailgate is in the closed position; the second outer surface faces rearward when the tailgate is in the closed position; and the first outer surface forms an inner surface of the cargo bed when the tailgate is in the closed position.

In further features, one or more storage compartments are formed in the second inner surface.

In further features: a left storage box disposed within the cargo bed and rearwardly of a left rear wheel well; and a right storage box disposed within the cargo bed and rearwardly of a right rear wheel well.

In further features: the left storage box includes at least one first extension panel configured to move rearwardly from the right storage box and directly contact the inner portion when the inner portion is in the vertical position; and the right storage box includes at least one second extension panel configured to move rearwardly from the right storage box and to directly contact the inner portion when the inner portion is in the vertical position.

In further features, the left storage box is open when the at least one first extension panel is moved rearwardly, and the right storage box is open when the at least one second extension panel is moved rearwardly.

In further features, heights of the at least one first extension panel and the at least one second extension panel are at least three-quarters of a height of the cargo bed.

In further features: the left storage box includes a first glide; the at least one first extension panel is configured to move rearwardly along the first glide; the right storage box includes a second glide; and the at least one second extension panel is configured to move rearwardly along the second glide.

In further features, the inner portion further includes: a first latch configured to latch to a first catch of the at least one first extension panel; and a second latch configured to latch to a second catch of the at least one second extension panel.

In further features: the first catch includes a first aperture through the at least one first extension panel; and the second catch includes a second aperture through the at least one second extension panel.

In further features: the first latch includes a first c-shaped portion configured to engage the first aperture; and the second latch includes a second c-shaped portion configured to engage the second aperture.

In further features: the first latch further includes a first extension that extends away from the first c-shaped portion; and the second latch further includes a second extension that extends away from the second c-shaped portion.

In further features: the first latch is configured to, when latched to the first catch, hold the at least one first extension panel in direct contact with the inner portion; and the second latch is configured to, when latched to the second catch, hold the at least one second extension panel in direct contact with the inner portion.

In a feature, a cargo bed extension system of a pickup truck includes: a cargo bed; a tailgate configured to pivot to a down position via one or more first hinges, where the tailgate includes: an outer portion having first lateral sides and one or more second hinges; an inner portion having second lateral sides that are disposed adjacent to the first lateral sides when the tailgate is in the down position, where the inner portion is configured to rotate to a vertical position via the one or more second hinges, where the vertical position is approximately perpendicular to the down position; at least one first extension panel configured to move rearwardly and directly contact the inner portion when the inner portion is in the vertical position; and at least one second extension panel configured to move rearwardly and to directly contact the inner portion when the inner portion is in the vertical position.

In further features: a first latch is configured to latch to a first catch of the at least one first extension panel; and a second latch is configured to latch to a second catch of the at least one second extension panel.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Pickup trucks include a cargo bed where cargo can be stored during transport from location to location. Different lengths of cargo beds are available, such as 8 feet long and shorter lengths, such as 5 foot 10 inch long cargo beds. Cargo beds that are shorter than 8 feet long, however, may not be able to carry some longer items (e.g., 8 foot long sheets of drywall, wood, etc.) on the floor of the cargo bed.

The present application involves a two-piece tailgate. When the tailgate is folded down, an inner portion of the tailgate can be rotated to be vertically oriented to create an at least 8 foot length between a front most portion of the cargo bed and the inner portion of the tailgate. The outer portion of the tailgate forms a floor and extends a length of the cargo bed.

Rearwardly extending panels may be moved rearwardly toward the vertically oriented inner portion of the tailgate and latched to the inner portion of the tailgate. The panels create sidewalls and enclose the then longer cargo bed such that the cargo bed is at least 8 feet long.

Figure 1:
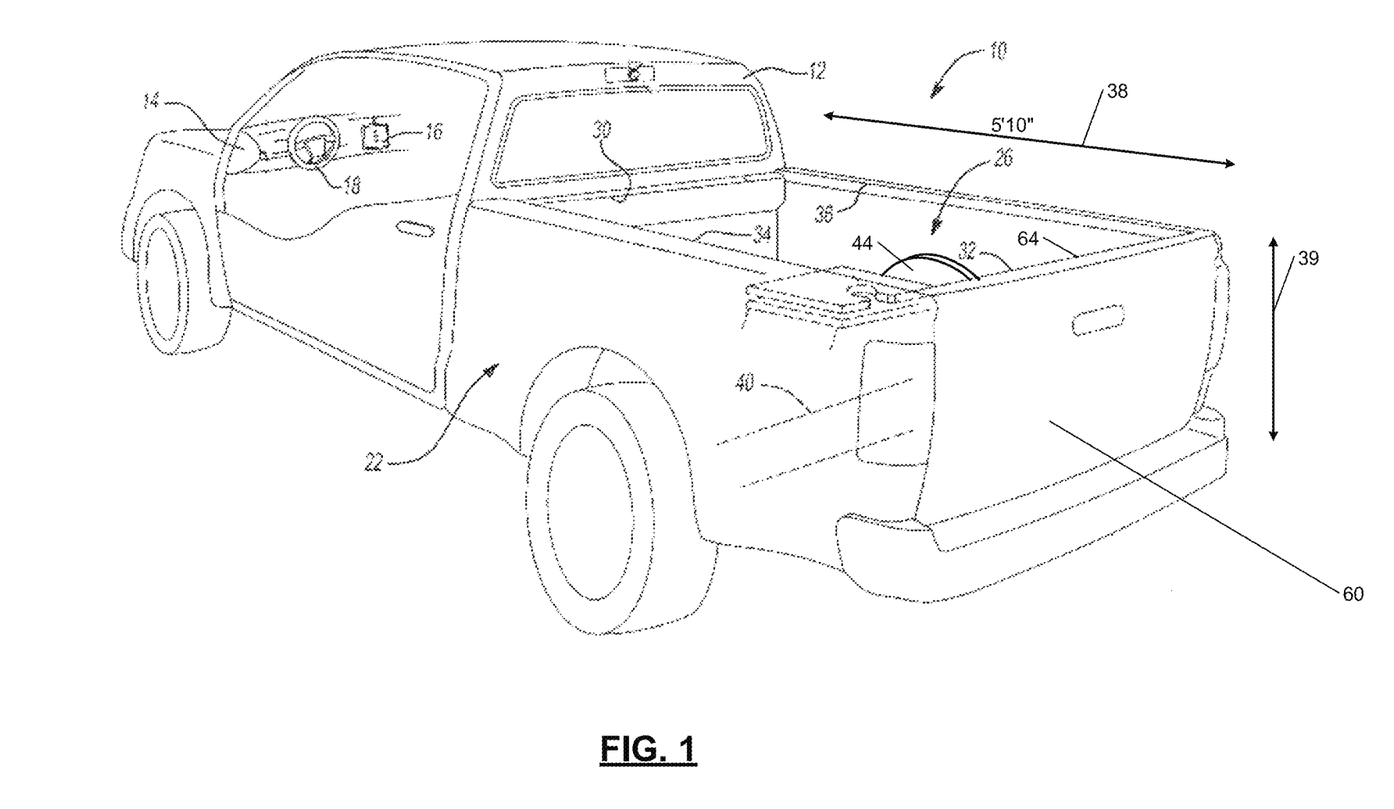
FIG. 1 is a rear perspective view of an example truck.

FIG. 1 is a rear perspective view of an example (pickup) truck 10. The truck 10 includes a cab 12 and may include an instrument panel 14, an electronic display 16, and a steering wheel 18. Passengers sit within the cab 12. The cab 12 may also be referred to as a passenger cabin.

The truck 10 includes a cargo bed 22 and may include one or more trailer hitches, such as 26. The cargo bed 22 may be referred to as a bed. In various implementations, the trailer hitch 26 may be omitted.

The cargo bed 22 has a front interior portion 30, a tailgate 32, a left interior portion 34, and a right interior portion 36. The front interior portion 30, the tailgate 32, the left interior portion 34, and the right interior portion 36 extend vertically from an upper edge to a floor of the cargo bed 22. A length 38 of the cargo bed 22 from the front interior portion 30 to the tailgate 32 may be 5 feet 10 inches. A vertical height 39 of the tailgate 32 may be at least 22 inches as to be able to extend the cargo bed 22 to a length of at least 8 feet (including pivoting and clearance), as discussed further below.

A rear axle 40 transfers torque to and from rear wheels of the truck 10. Wheel wells, such as 44, surround the rear wheels and may extend (horizontally and vertically) into the cargo bed 22. In other words, the wheel wells 44 may occupy volume of the cargo bed 22. Portions of the left and right interior portions 34 and 36 are disposed vertically above the wheel wells 44. Various threaded bolt holes may be formed in at least one of the front, rear, left, and right interior portions 30, 32, 34, and 36.

The present application involves the tailgate 32 including an outer portion 60 and an inner portion 64. The tailgate 32 can fold down (via hinges) such that the outer portion 60 is approximately parallel to a road surface and a longitudinal axis of the truck (e.g., perpendicularly to the orientation shown in FIG. 1). When the tailgate 32 is folded down, the inner portion 64 can be pivoted such that the inner portion 64 extends vertically and approximately parallel to the orientation of the tailgate 32 shown in FIG. 1. Panels can be extended rearwardly approximately parallel to the left and right interior portions 34 and 36 and latched to the vertically oriented inner portion 64. This may extend the cargo bed 22 to at least 8 feet long.

Figure 2:
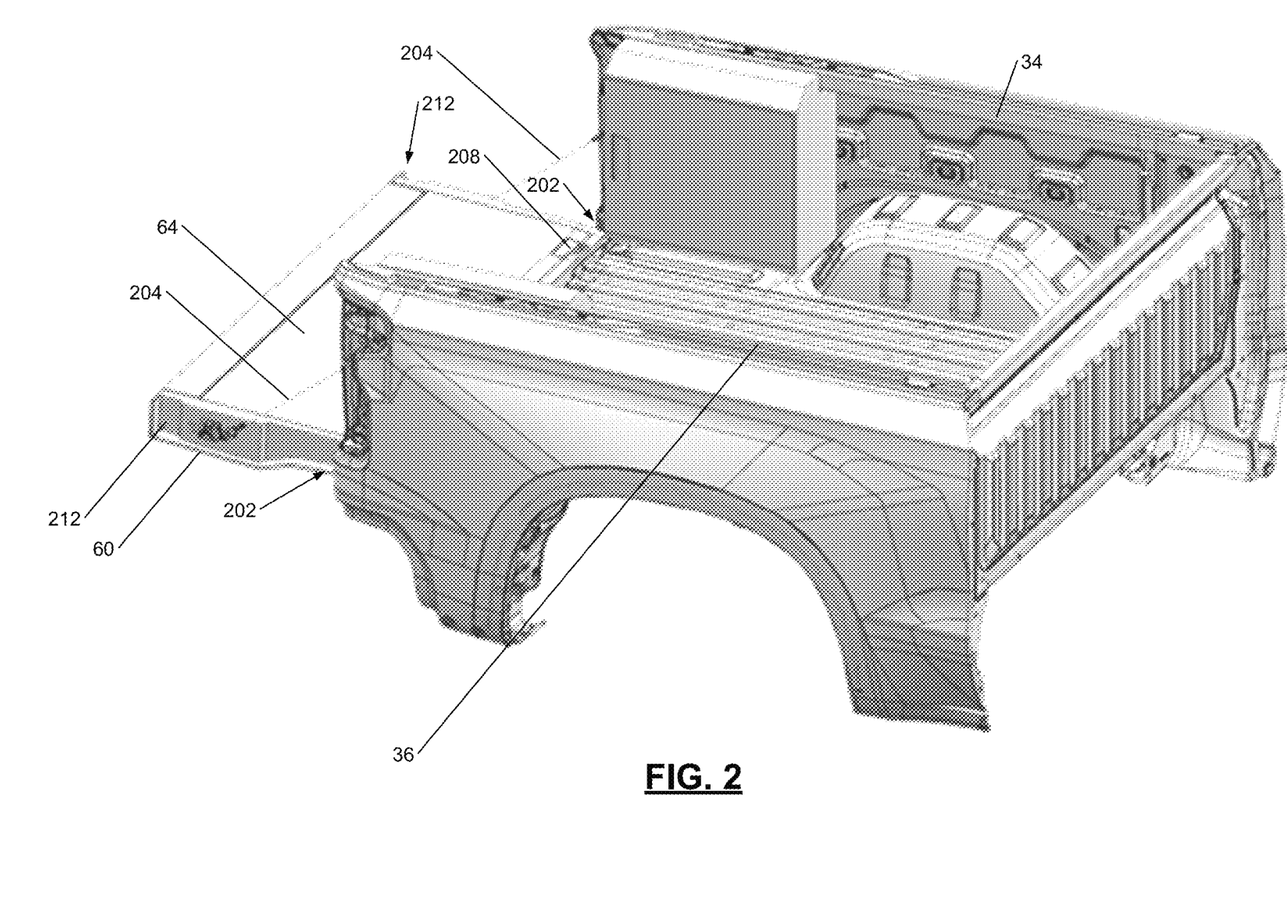
FIG. 2 is a side perspective view of the cargo bed with the tailgate in a down position.

FIG. 2 is a side perspective view of the cargo bed 22 with the tailgate 32 in a down position. The tailgate 32 hinges at a bottommost portion of the tailgate 32 via hinges 202. Tailgate cables 204 are connected at first ends to the cargo bed 22 and at second ends to the outer portion 60 of the tailgate 32. When connected, the tailgate cables 204 prevent the tailgate 32 from rotating further than the down position shown in FIG. 2.

One or more handles 208 are formed on the inner portion 64 of the tailgate 32. The inner portion 64 is hinged to the outer portion 60 via hinges 212. When the tailgate 32 is closed, the inner portion 64 defines an interior portion of the cargo bed 22. The handles 208 enable the inner portion 64 to be moved via the hinges 212 and rotated to a vertical position where the inner portion 64 is approximately perpendicular to the outer portion 60 and approximately parallel to the tailgate 32 when closed.

Figure 3:
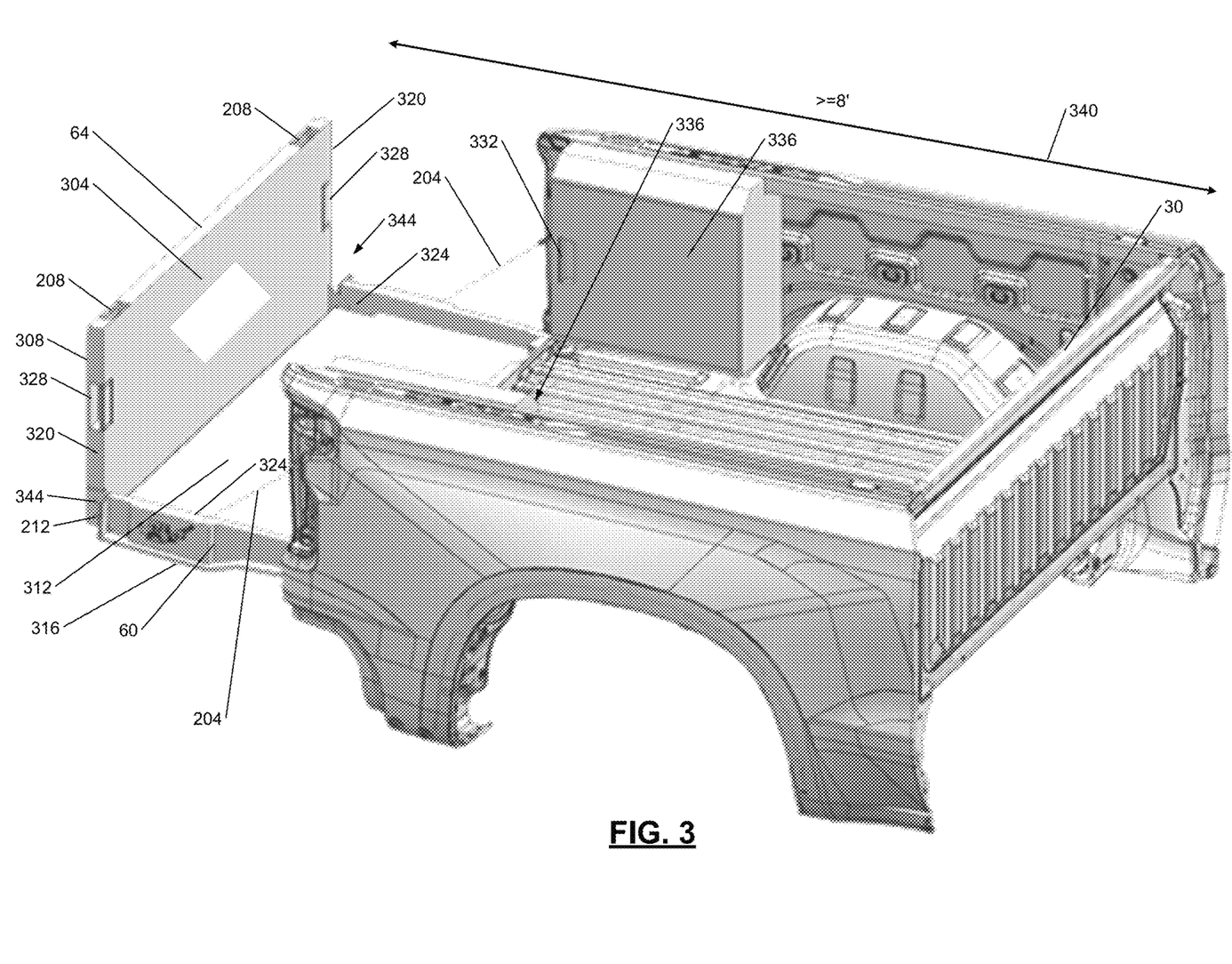
FIG. 3 includes a side perspective view illustrating an example orientation with an inner portion of the tailgate in a vertical position.

FIG. 3 includes a side perspective view illustrating an example orientation with the inner portion 64 in the vertical position. The inner portion 64 includes an inner surface 304 and an outer surface 308. The outer portion 60 includes an inner surface 312 and an outer surface 316. The inner surface 312 of the outer portion 60 faces and may contact the inner surface 304 when the inner and outer portions 64 and 60 are in the position shown in FIG. 2. The inner surface 312 may be approximately perpendicular or perpendicular to the inner surface 304 when the inner portion 64 is in the vertical position. Laterally outer edges 320 of the inner portion 64 face and disposed with laterally inner edges 324 of the outer portion 60 when the inner and outer portions 64 and 60 are in the position shown in FIG. 2.

A length 340 of the cargo bed 22 from the front interior portion 30 to the inner portion 64 when the inner portion 64 is in the vertical position is at least 8 feet. As such, 8 foot long cargo, such as drywall, lumber, and other types of cargo, can be stored flat on the floor of the cargo bed 22 with the inner portion 64 in the vertical position.

As shown in FIG. 3, latches 328 are formed on the laterally outer edges 320 of the inner portion 64. The latches 328 latch to catches 332 formed on extension panels 336 when the extension panels 336 are extended rearwardly to the inner portion 64, as discussed further below. In various implementations, the catches 332 may be apertures through one of the extension panels 336. A height of the extension panels 336 is at least three-quarters of a height of the cargo bed 22 and may be approximately equal to the height of the cargo bed 22.

Spring pins 344 may extend through apertures in the laterally outer edges 320 of the inner portion 64 and lock the inner portion 64 in the vertical position. The spring pins 344 can be actuated (e.g., pushed laterally inward) to allow the inner portion 304 to rotate about the hinges 212 to a loading position. Actuation of the handles 208 may actuate the spring pins 344. Actuation of one of the handles 208 may actuate both of the spring pins 344, or actuation of the handles 208 may actuate the spring pins 344, respectively.

Figure 4:
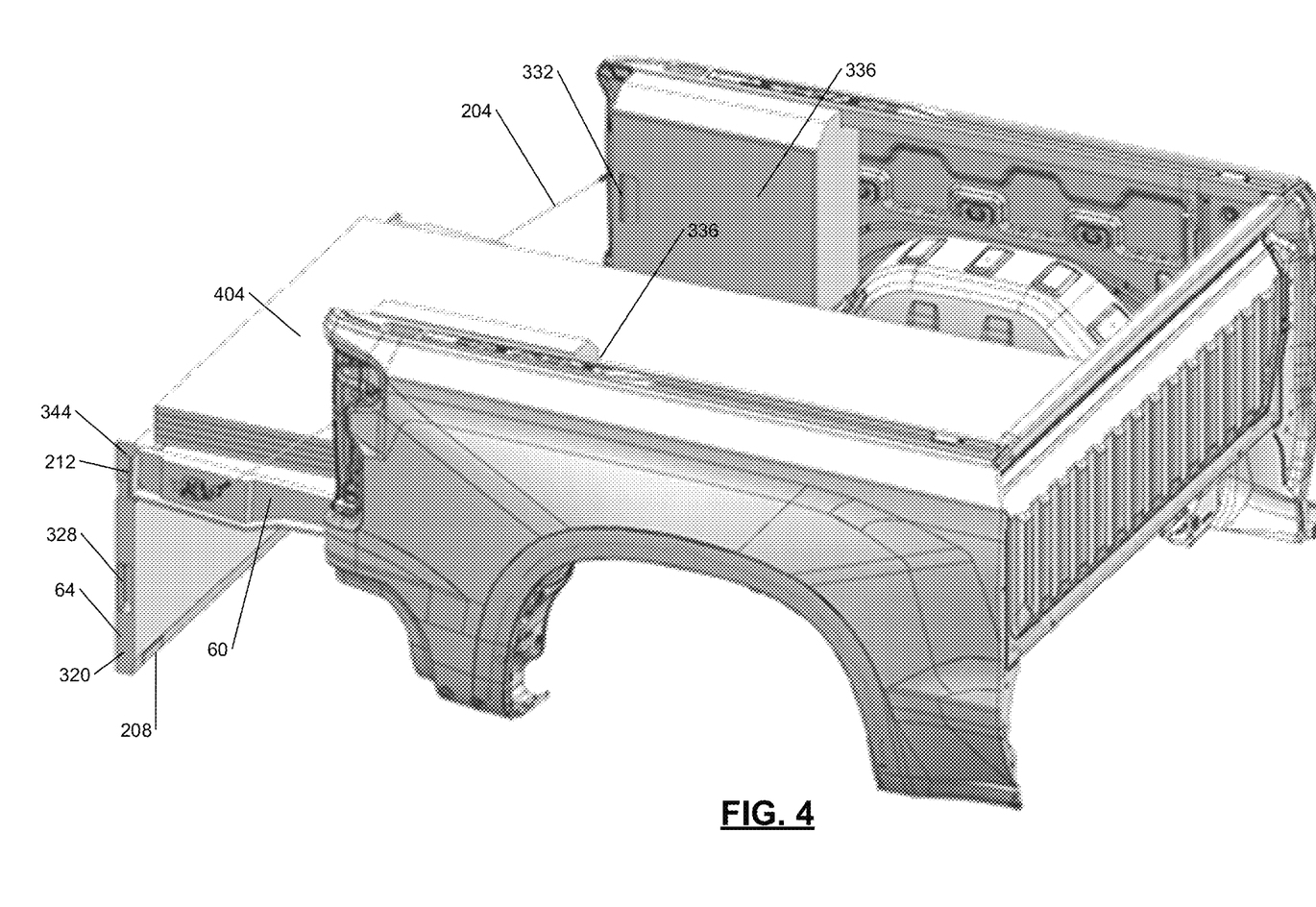
FIG. 4 includes an example illustration of the inner portion of the tailgate in a loading position.

FIG. 4 includes an example illustration of the inner portion 64 in the loading position. FIG. 4 also illustrates example 8 foot long cargo 404 stored flat on the floor of the cargo bed 22.

The inner portion 64 may be approximately perpendicular or perpendicular to the outer portion 60 when the inner portion 64 is in the loading position. The spring pins 344 may lock the inner portion 64 in the loading position such that the spring pins 344 need to be actuated to actuate the inner portion 64 back to the vertical position.

Figure 5:
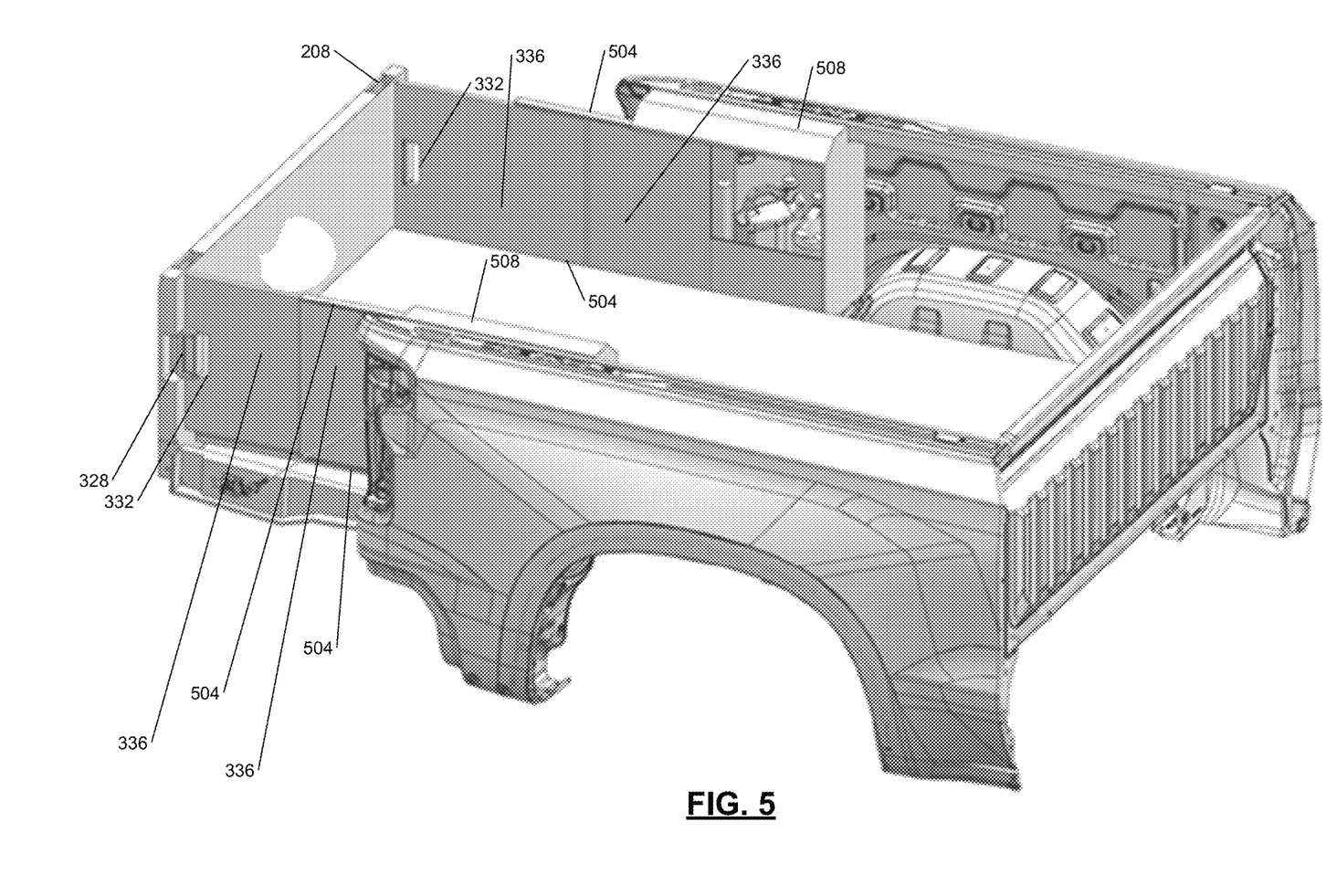
FIGS. 5-6 includes a side perspective view with the inner portion of the tailgate in the vertical position.

FIG. 5 includes a side perspective view with the inner portion 64 back in the vertical position. In FIG. 5, the latches 328 are illustrated latched to the catches 332 on the extension panels 336. The extension panels 336 are illustrated in a rearwardly extended position. The extension panels 336 actuate forwardly and rearwardly along extension slides 504. The extension slides 504 may be, for example, ball bearing slides, guides, tracks, or another type of slider. The extension panels are mounted to storage boxes 508 that extend laterally inward from the left and right interior portions 34 and 36 of the cargo bed 22. As illustrated, the storage boxes 508 are located rearwardly of the wheel wells 44. When the extension panels 336 are rearwardly extended, the storage boxes 508 are open, and items can be stored within the storage boxes 508. The storage boxes 508 are closed when the extension panels 336 are not rearwardly extended. While the example of two extension panels 336 on each of the left and right sides is provided, the present application is also applicable to one storage panel per side and more than two storage panels per side.

The extension panels 336 and the tailgate 32 extend the cargo bed 22 to be at least 8 feet long.

Figure 6:
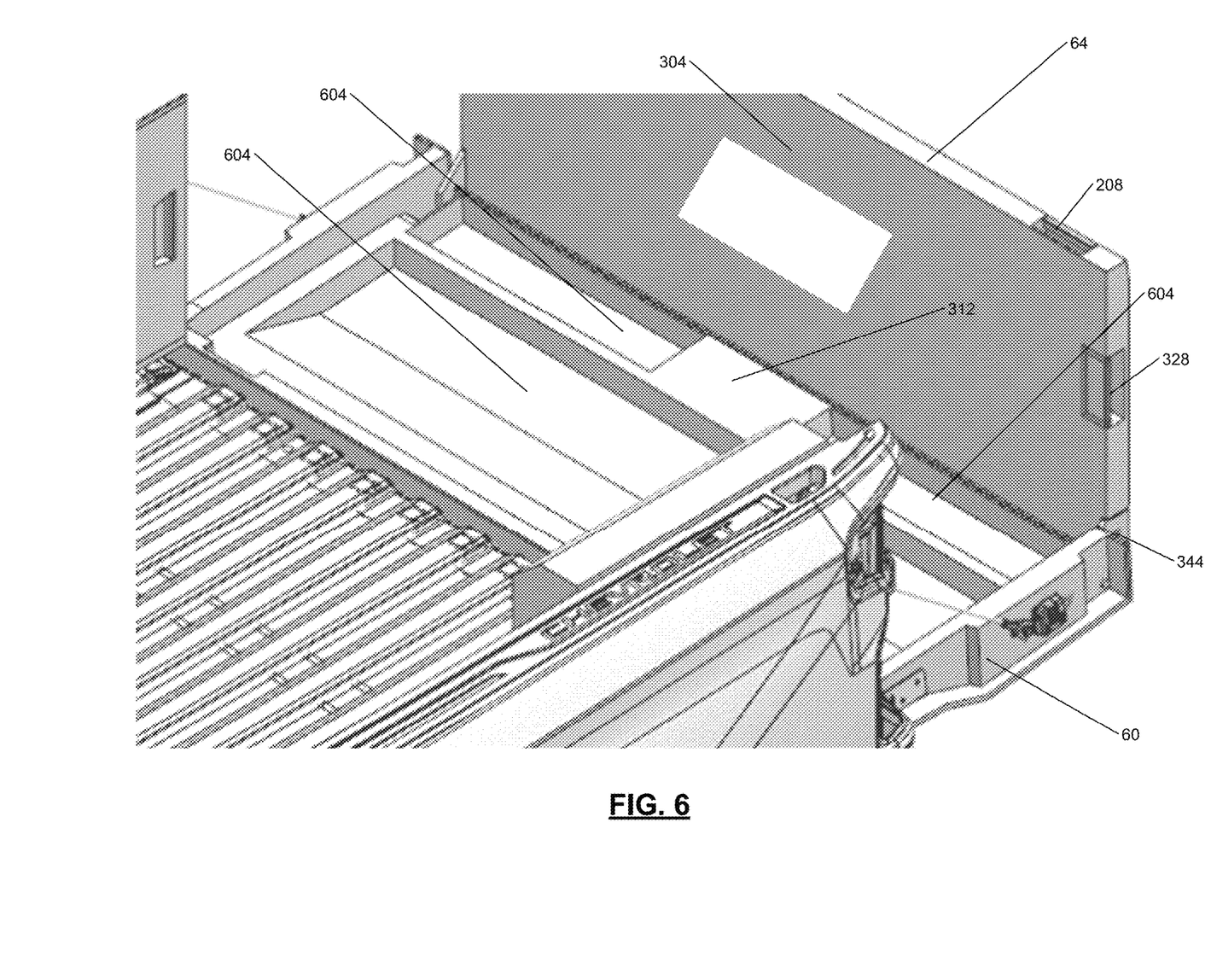

FIG. 6 includes a side perspective view with the inner portion 64 back in the vertical position. As illustrated in FIG. 6, one or more storage compartments (e.g., depressions) 604 may be formed in the inner surface 312 of the outer portion 60. The storage compartments 604 may be closed by the inner portion 64 when the inner portion 64 is in the position shown in FIG. 2. While the example of three storage compartments is provided, the present application is also applicable to zero, one, two, and more than three storage compartments.

Figures 7A, 7B:
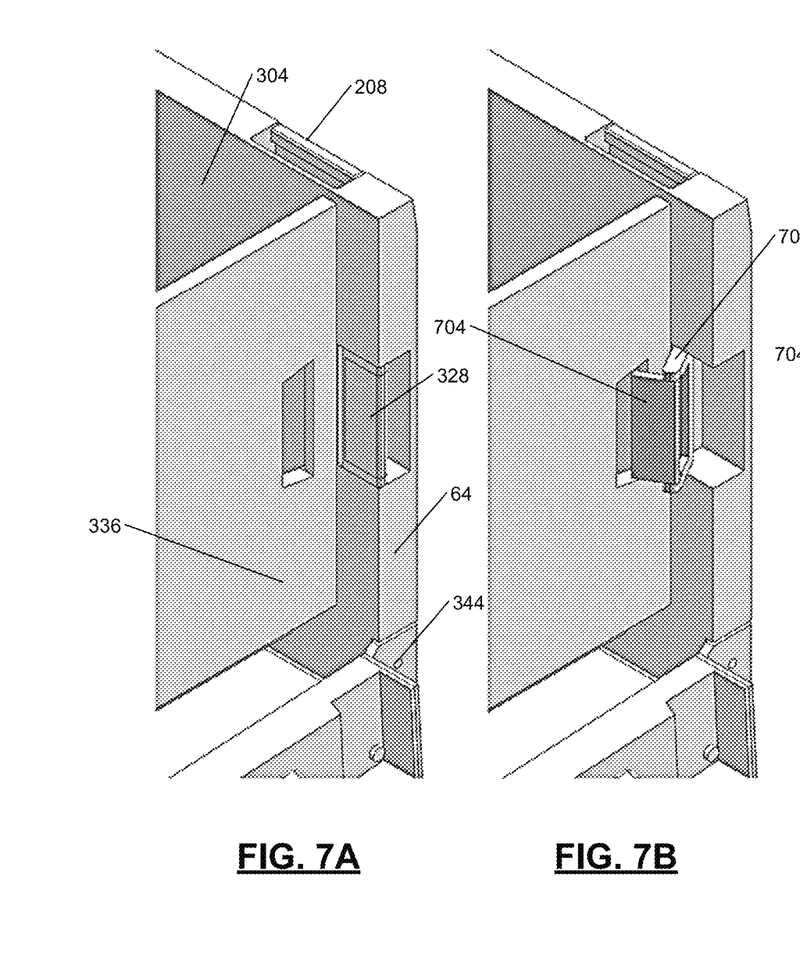
FIGS. 7A-7D include perspective views of a latch and a catch with FIG. 7D including a cross-sectional view of an example latch and catch.
Figure 7C:
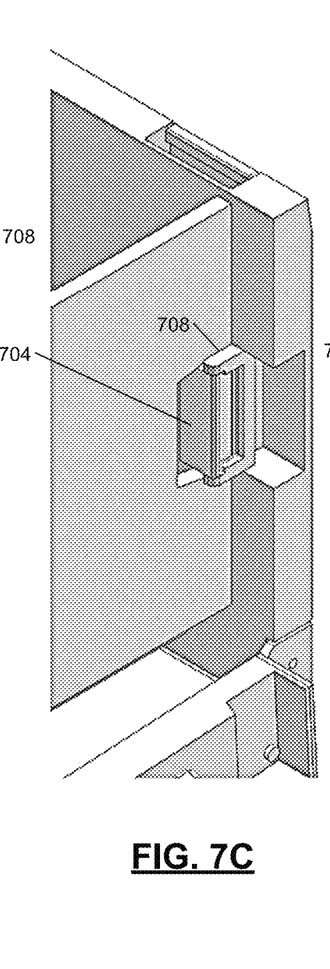
Figure 7D:
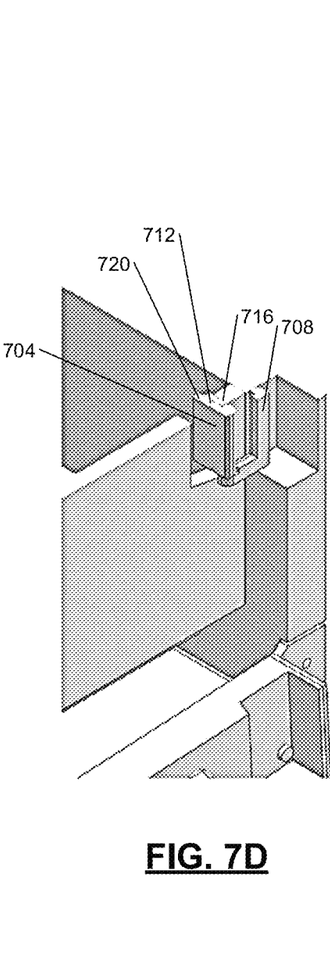

FIGS. 7A-7D include perspective views of the latch 328 and the catch 332. FIG. 7D includes a cross-sectional view of the latch 328 and the catch 332.

As shown in FIG. 7A, the extension panels 336 may be rearwardly extended until at least one of the extension panels 336 contacts the inner surface 304 of the inner portion 64. When the extension panel 336 is contacting the inner surface 304, the latch 328 may be actuated (e.g., manually) to latch the extension panel 336 to the inner portion 64.

FIGS. 7B and 7C include an example illustration of latching the extension panel to the inner portion 64 using the latch 328. The latch 328 may include a first portion 704 and a second portion 708. One or more biasing devices (e.g., springs) may bias first portion 704 and the second portion 708 toward the positions illustrated in FIG. 7A and to maintain the latch 328 engaged when the latch 328 is latched to the catch 332. The first portion 704 may include a C-shaped portion 712 that is configured to engage the catch 332 (e.g., a notch 716 in the catch) and secure the extension panel 336 to the inner portion 64. In various implementations, the first portion 704 include an extension 720 that extends away from the C-shaped portion 712. The extension 720 may help a user release the latch 328 by reaching through the catch 332 and pulling the extension 720 forward.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

Forward, rearward, right, and left as used herein may be directional relative to a normal orientation of the vehicle. For example, forward may mean in a normal forward direction of the vehicle, and rearward may mean a normal reverse direction of the vehicle. Right may mean in a normal right (relative to forward) direction of the vehicle, and left may mean in a normal left (relative to forward) direction of the vehicle. Approximately as used herein may mean+/−10% as it relates to measurements or within 10 degrees regarding angles.

What is claimed is:

1. A cargo bed extension system of a pickup truck, the system comprising:
   a cargo bed;
   a tailgate that defines a rearward most point of the cargo bed, the tailgate defining a portion of a top most edge of the cargo bed when the tailgate is in a closed position and configured to pivot to a down position via one or more first hinges,
   wherein the down position is approximately perpendicular to the closed position,
   wherein a first distance between a forward most point of the cargo bed and the tailgate when the tailgate is in the closed position is less than or equal to 6 feet, and
   wherein the tailgate includes:
      an outer portion having first lateral sides and one or more second hinges; and
      an inner portion having second lateral sides that are disposed adjacent to the first lateral sides when the tailgate is in the down position,
      wherein the inner portion is configured to rotate to a vertical position via the one or more second hinges,
      wherein the vertical position is approximately parallel to the closed position and approximately perpendicular to the down position, and
      wherein a second distance between the forward most point of the cargo bed and the inner portion when the inner portion is in the vertical position is at least 8 feet;
   a left storage box disposed within the cargo bed and rearwardly of a left rear wheel well; and
   a right storage box disposed within the cargo bed and rearwardly of a right rear wheel well:
   wherein:
      the left storage box includes at least one first extension panel configured to move rearwardly from the right storage box and directly contact the inner portion when the inner portion is in the vertical position;
      the right storage box includes at least one second extension panel configured to move rearwardly from the right storage box and to directly contact the inner portion when the inner portion is in the vertical position; and
      the left storage box is open when the at least one first extension panel is moved rearwardly, and the right storage box is open when the at least one second extension panel is moved rearwardly.

2. The system of claim 1 wherein the first distance is 5 feet 10 inches.

3. The system of claim 1 wherein a height of the outer portion is at least 20 inches.

4. The system of claim 1 further comprising at least one spring pin configured to maintain the inner portion in the vertical position.

5. The system of claim 1 wherein the inner portion is further configured to rotate to a second vertical position via the one or more second hinges, wherein the second vertical position is approximately parallel to the closed position, approximately perpendicular to the down position, and approximately 180 degrees from the vertical position.

6. The system of claim 1 wherein the inner portion includes one or more handles formed in an edge of the inner portion disposed closest to the one or more first hinges when the tailgate is in the closed position.

7. The system of claim 1 wherein:
   the inner portion includes a first inner surface and a first outer surface;
   the outer portion includes a second inner surface and a second outer surface;
   the first inner surface faces the second inner surface when the tailgate is in the closed position;
   the second outer surface faces rearward when the tailgate is in the closed position; and
   the first outer surface forms an inner surface of the cargo bed when the tailgate is in the closed position.

8. The system of claim 7 further comprising one or more storage compartments formed in the second inner surface.

9. The system of claim 1 wherein heights of the at least one first extension panel and the at least one second extension panel are at least three-quarters of a height of the cargo bed.

10. The system of claim 1 wherein:
    the left storage box includes a first glide;
    the at least one first extension panel is configured to move rearwardly along the first glide;
    the right storage box includes a second glide; and
    the at least one second extension panel is configured to move rearwardly along the second glide.

11. A cargo bed extension system of a pickup truck, the system comprising:
    a cargo bed;
    a tailgate that defines a rearward most point of the cargo bed, the tailgate defining a portion of a top most edge of the cargo bed when the tailgate is in a closed position and configured to pivot to a down position via one or more first hinges,
    wherein the down position is approximately perpendicular to the closed position,
    wherein a first distance between a forward most point of the cargo bed and the tailgate when the tailgate is in the closed position is less than or equal to 6 feet, and
    wherein the tailgate includes:
       an outer portion having first lateral sides and one or more second hinges; and
       an inner portion having second lateral sides that are disposed adjacent to the first lateral sides when the tailgate is in the down position,
       wherein the inner portion is configured to rotate to a vertical position via the one or more second hinges,
       wherein the vertical position is approximately parallel to the closed position and approximately perpendicular to the down position, and
       wherein a second distance between the forward most point of the cargo bed and the inner portion when the inner portion is in the vertical position is at least 8 feet;
    a left storage box disposed within the cargo bed and rearwardly of a left rear wheel well; and
    a right storage box disposed within the cargo bed and rearwardly of a right rear wheel well:
    wherein:
       the left storage box includes at least one first extension panel configured to move rearwardly from the right storage box and directly contact the inner portion when the inner portion is in the vertical position;
       the right storage box includes at least one second extension panel configured to move rearwardly from the right storage box and to directly contact the inner portion when the inner portion is in the vertical position;

the inner portion further includes:
a first latch configured to latch to a first catch of the at least one first extension panel; and
a second latch configured to latch to a second catch of the at least one second extension panel,
the first catch includes a first aperture through the at least one first extension panel;
the second catch includes a second aperture through the at least one second extension panel;
the first latch includes a first c-shaped portion configured to engage the first aperture; and
the second latch includes a second c-shaped portion configured to engage the second aperture.

12. The system of claim 11 wherein:
the first latch further includes a first extension that extends away from the first c-shaped portion; and
the second latch further includes a second extension that extends away from the second c-shaped portion.

13. The system of claim 11 wherein:
the first latch is configured to, when latched to the first catch, hold the at least one first extension panel in direct contact with the inner portion; and
the second latch is configured to, when latched to the second catch, hold the at least one second extension panel in direct contact with the inner portion.

14. A cargo bed extension system of a pickup truck, the system comprising:
a cargo bed;
a tailgate configured to pivot to a down position via one or more first hinges,
wherein the tailgate includes:
an outer portion having first lateral sides and one or more second hinges;
an inner portion having second lateral sides that are disposed adjacent to the first lateral sides when the tailgate is in the down position,
wherein the inner portion is configured to rotate to a vertical position via the one or more second hinges, wherein the vertical position is approximately perpendicular to the down position;
at least one first extension panel configured to move rearwardly and directly contact the inner portion when the inner portion is in the vertical position; and
at least one second extension panel configured to move rearwardly and to directly contact the inner portion when the inner portion is in the vertical position,
wherein the inner portion further includes:
a first latch configured to latch to a first catch of the at least one first extension panel; and
a second latch configured to latch to a second catch of the at least one second extension panel,
wherein:
the first catch includes a first aperture through the at least one first extension panel; and
the second catch includes a second aperture through the at least one second extension panel, and
wherein:
the first latch includes a first c-shaped portion configured to engage the first aperture; and
the second latch includes a second c-shaped portion configured to engage the second aperture.

15. The system of claim 14 wherein the first distance is 5 feet 10 inches.

16. The system of claim 14 wherein a height of the outer portion is at least 20 inches.

17. The system of claim 14 further comprising at least one spring pin configured to maintain the inner portion in the vertical position.

18. The system of claim 14 wherein the inner portion is further configured to rotate to a second vertical position via the one or more second hinges, wherein the second vertical position is approximately parallel to the closed position, approximately perpendicular to the down position, and approximately 180 degrees from the vertical position.

19. The system of claim 14 wherein the inner portion includes one or more handles formed in an edge of the inner portion disposed closest to the one or more first hinges when the tailgate is in the closed position.

20. The system of claim 14 wherein:
the inner portion includes a first inner surface and a first outer surface;
the outer portion includes a second inner surface and a second outer surface;
the first inner surface faces the second inner surface when the tailgate is in the closed position;
the second outer surface faces rearward when the tailgate is in the closed position; and
the first outer surface forms an inner surface of the cargo bed when the tailgate is in the closed position.

* * * * *